United States Patent [19]

Legleiter

[11] 4,091,846
[45] May 30, 1978

[54] FLUID TRANSFER METHODS AND APPARATUS

[76] Inventor: Paul P. Legleiter, 321 S. Hazel, Gaylord, Mich. 49735

[21] Appl. No.: 756,961

[22] Filed: Jan. 5, 1977

[51] Int. Cl.² .................................................. B65B 3/12
[52] U.S. Cl. ........................................ 141/1; 137/390; 141/198; 141/311 A; 417/40
[58] Field of Search ...................... 137/390; 141/1, 84, 141/102, 105, 115, 128, 198, 206, 217, 220, 392, 311 A; 417/40, 33

[56] References Cited

U.S. PATENT DOCUMENTS

| 2,200,697 | 5/1940 | Lindley | 137/390 |
| 3,814,544 | 6/1974 | Roberts et al. | 417/40 |

Primary Examiner—Richard E. Aegerter
Assistant Examiner—Frederick R. Schmidt
Attorney, Agent, or Firm—Learman & McCulloch

[57] ABSTRACT

Fluid is transferred from a reservoir to a tank by means of a pump which pumps fluid through a conduit communicating with the tank and separably coupled to the reservoir. Operation of the pump is governed by a control mechanism that is operable to enable and disable operation of the pump. The control mechanism is connected to an energy source via adjustable switching means which in one of its positions is operable to disable operation of the pump when the level of fluid in the tank reaches a predetermined height, and in another of which it is operable to enable operation of the pump regardless of the fluid level in the tank.

12 Claims, 4 Drawing Figures

FLUID TRANSFER METHODS AND APPARATUS

The invention disclosed herein relates to apparatus and methods for transferring fluids, such as crude oil, from a reservoir to a portable tank. Conventionally, crude oil from a well is pumped through pipes to a fixed storage reservoir adjacent the well head, the storage reservoir having an outlet to which one end of a conduit may be coupled to enable oil to be pumped from the reservoir via the conduit to a portable tank such as a vehicular tank trailer.

In the present practice in transferring oil from a storage reservoir to a tank trailer, the trailer is driven alongside the reservoir so as to make possible the coupling of a trailer-carried conduit to the outlet of the reservoir. The trailer conventionally is provided with a pump by means of which oil may be pumped from the reservoir through the conduit into the tank. The pump is equipped with a controllable drive mechanism so as to enable the pump to be started and stopped.

One of the troublesome characteristics of transferring oil from a reservoir to a tank trailer is ascertaining when the trailer is full. It is not uncommon for the vehicle driver to have to climb upon the tank to watch the fluid level during the transfer process and effect manual stopping of the pump when the trailer is filled. Climbing the tank can be hazardous. In addition, the tank filling process can require substantial time. It is not uncommon, therefore, for the driver to leave the vehicle during the tank filling process, with the result that it is not unusual for the tank to be overfilled, thereby resulting in considerable spillage of oil.

Some trailer tanks currently in use are fitted with float controlled mechanisms which are operable, when the tank is filled, to energize an audible signal or to effect stopping of the pump. Such devices minimize overfilling of the tank. However, when the pump is stopped, the conduit which extends between the tank and the reservoir contains oil. When the conduit is disconnected from the reservoir, the oil remaining in the conduit all too often spills onto the ground, thereby resulting in waste and, after a period of time, an excessive accumulation of oil on the ground.

The filling of a tank with fluid in accordance with the invention prevents overflow of the tank by disconnecting the fluid pump from its source of energy when the level of fluid in the tank rises to a predetermined level. Spillage of fluid following uncoupling of a trailer-carried conduit from the reservoir is prevented by the provision of means for restarting the pump to enable the contents of the conduit to be pumped to the tank.

Apparatus and methods according to the invention are illustrated in the accompanying drawing wherein.

Figure 1:
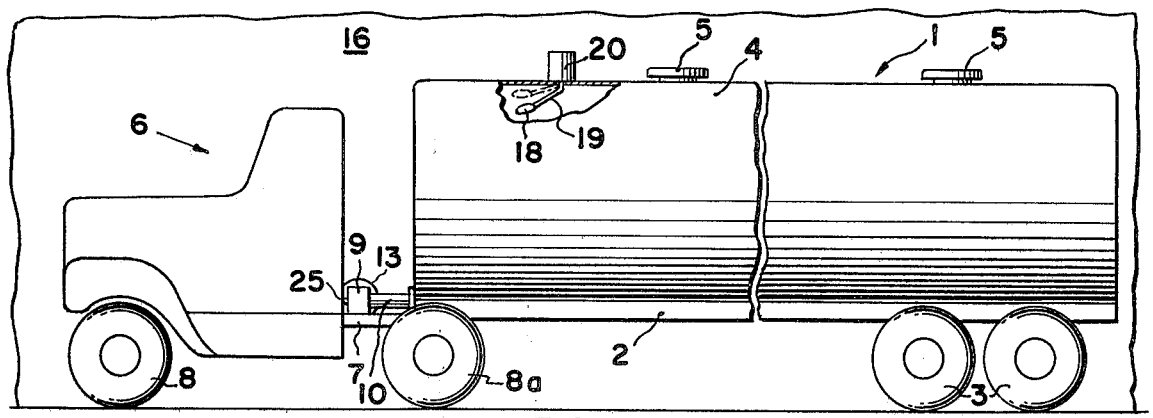
FIG. 1 is a fragmentary, side elevational view illustrating a vehicular tank located adjacent a fluid reservoir from which fluid is to be pumped into the tank.

Apparatus constructed in accordance with the invention is adapted for use with a conventional tank trailer 1 having a chassis 2 provided with wheels 3 and a cylindrically or other shaped tank 4 adapted to contain a liquid. The upper side of the tank has openings which normally are closed by removable covers 5. The tank also includes means (not shown) for enabling the contents of the tank to be discharged. The trailer 1 is coupled removably to a tractor 6 by a conventional fifth wheel (not shown), the tractor having a chassis 7 provided with steerable wheels 8 and driving wheels 8a.

A vehicle of the character described conventionally is provided with a pump 9 having its outlet side in communication with the tank 4 via a hose or other conduit 10 and a check valve 11 which enables liquid to be pumped into the tank, but prevents discharge of the liquid through the conduit 10. The inlet side of the pump is coupled to one end of a conduit 12 of considerable length, the opposite end of which is provided with a quick coupling device 13 that is adapted to be removably connected to a fitting 14 provided at the outer end of a discharge pipe 15 which communicates with the interior of a liquid storage reservoir 16. A valve 17 forming part of the fitting 14 is operable to enable and disable liquid to be discharged from the reservoir.

The coupling 13 may be any one of a number of conventional couplings which are equipped with means for enabling air to enter the conduit 12 when desired. Typical of such couplings are those disclosed in U.S. Pat. Nos. 2,033,142 and 2,518,026.

Figure 3:
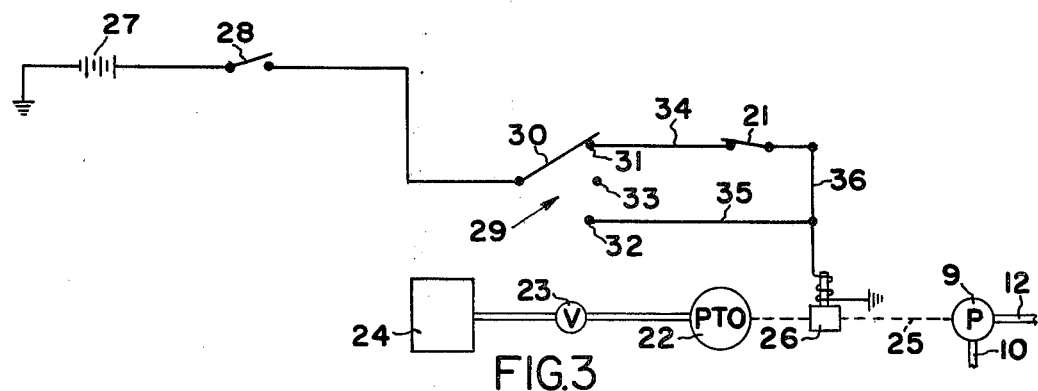
FIG. 3 is a schematic diagram illustrating one embodiment of the invention.

Within the tank 4 and at the upper end thereof is a float 18 mounted at one end of an arm 19, the opposite end of which extends through the wall of the tank into a housing 20 within which is an electrical switch 21 (FIG. 3). The float 18 rises and falls in accordance with corresponding changes in the level of liquid in the tank 4 and the switch 21 is of such construction that it is closed by the arm 19 when the float is at a level lower than a predetermined, higher level. Movement of the float to the predetermined higher level effects opening of the switch 21 for a purpose presently to be explained. The switch 21 may be selected from any one of a number of known explosion proof switches.

Most vehicles designed for the purpose of transporting oil and the like have a power take-off unit and onboard means for operating such unit. In the embodiment illustrated in FIG. 3, a pneumatic power take-off 22 is connected through a valve 23 to an on-board air compressor 24. The power take-off unit 22 has an output shaft 25 that is drivingly engageable with the pump 9 via a solenoid actuated coupling or clutch 26 which is operable to effect engagement and disengagement of the power take-off unit with and from the pump.

The solenoid controlled coupling 26 is connected into the vehicle's electrical circuit which includes an energy source 27, such as a battery, generator, and the like, an ignition controlled switch 28, and a toggle switch 29 that is adjustable to any selected one of three positions denominated automatic, manual, and off. The toggle switch 29 has an operating arm 30 which is engageable with any one of three contacts 31, 32, and 33. To the contact 31 is joined a line 34 containing the float controlled switch 21. The contact 32 forms part of a line 35 in the circuit of the solenoid actuated coupling 26. The lines 34 and 35 are bridged by a line 36. The contact 31 corresponds to the automatic position of the switch 29, the contact 32 corresponds to the manual position, and the contact 33 corresponds to the off position.

Figure 2:
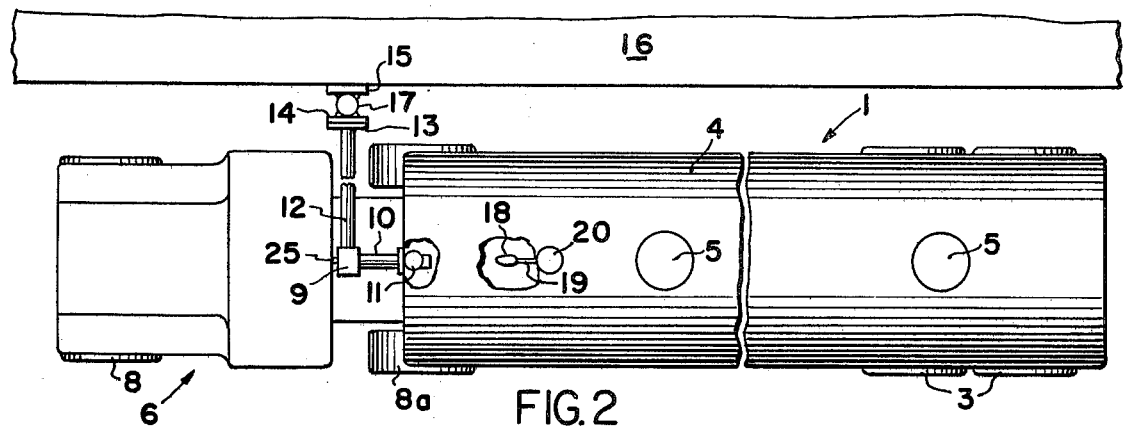
FIG. 2 is a top plan view illustrating the tank, the reservoir, and some of the components for transferring fluid from the reservoir to the tank.

When the vehicle is in the position indicated in FIG. 2 with the conduit 12 coupled to the reservoir discharge pipe 15, the valve 17 may be opened so as to enable fluid to flow through the conduit 12 to the pump 9. If the contents of the tank 4 are sufficiently low that the float control switch 21 is in its closed position, then closing of the vehicle's ignition switch 28 and movement of the operating arm 30 of the switch 29 from the off position contact 33 to the automatic position contact 31 will effect energization of the solenoid actuated clutch 26 to couple the power take-off 22 to the pump 9. Opening of the valve 23 thus will enable the power take-off unit to drive the pump 9 to pump liquid from the reservoir 16 into the tank 4.

As the level of liquid in the tank 4 rises, the float 18 also will rise, thereby effecting movement of the arm 19. When the float reaches a predetermined position, such as that caused by the level of liquid in the tank rising to within a few inches below the top of the tank, the switch 21 will be opened, thereby breaking the circuit to and deenergizing the coupling 26 and terminating operation of the pump 9. Stopping of the operation of the pump 9 is automatic and does not require the attention or presence of the vehicle operator.

By the time the float control switch 21 is opened, the tank 4 will be virtually full, but there still will be some space within the tank for additional liquid. Thus, the vehicle operator may close the valve 17 to prevent further withdrawal of oil from the reservoir 16. Thereafter, the operator may manipulate the coupling 13 to permit air to enter the conduit 12 and move the switch 29 from its automatic position to its manual position in which the operating arm 30 engages the contact 32. This adjustment of the switch 29 will effect reenergization of the solenoid controlled coupling 26 so as to recouple the power take-off unit 22 to the pump 9, thereby enabling the contents of the conduit 12 to be pumped into the tank 4. When the conduit 12 has been drained, the switch 29 may be moved to its off position and the conduit uncoupled from the reservoir fitting 14. Since the contents of the conduit 12 have been pumped into the tank 4, uncoupling of the conduit from the reservoir will not result in any oil spillage.

Figure 4:
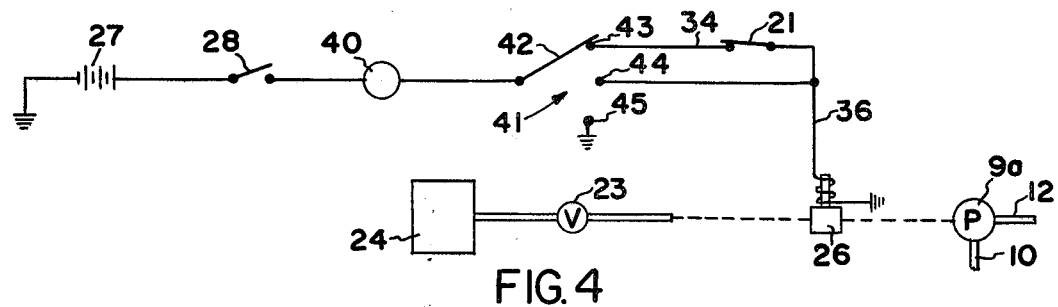
FIG. 4 is a schematic diagram illustrating another embodiment of the invention.

The apparatus shown in FIG. 4 is similar to that illustrated in FIG. 3. In the embodiment in FIG. 4, however, the pump 9a is a pneumatic pump adapted to be coupled via the valve 23 and the coupling 26 to the air compressor 24. The apparatus shown in FIG. 4 also includes the vehicle's fuel pump 40 which is electrically operated.

An adjustable switch 41 has an operating arm 42 adapted to engage a contact 43 which is in circuit with the float controlled switch 21 and with the solenoid actuated coupling or clutch 26. The switch arm 42 also is adapted to engage a contact 44 which bypasses the float control switch 21 and is in circuit with the coupling 26. The arm 42 also is adapted to engage a grounded contact 45. The contact 43 defines an automatic position, the contact 44 defines a manual position, and contact 45 defines an off position for the switch 41.

In the operation of the apparatus shown in FIG. 4, closing of the ignition switch 28, when the float control switch 21 is closed and when the switch arm 42 is in its automatic position, enables the fuel pump 40 to operate and effects energization of the coupling 26, thereby enabling the air compressor 24 to drive the pump 9a and deliver fluid from the reservoir 16 to the tank 4. When the level of the fluid in the tank rises to within a few inches of the top of the tank, the float operated switch 21 will be opened thereby breaking the circuit to the coupling 26 and to the fuel pump 40. Opening of the switch 21 not only terminates operation of the pump 9, but also terminates operation of the vehicle engine which is supplied with fuel from the pump 40.

Following automatic termination of operation of the pump 9a, the switch arm 42 may be moved to its manual position thereby reestablishing a circuit to the fuel pump 40 and to the coupling 26 to enable pumping of fluid from the conduit 12 into the tank in the same manner earlier described.

The off position of the switch 41 is provided to enable operation of the fuel pump 40 without corresponding operation of the pump 9a.

The disclosed embodiments are representative of presently preferred methods and apparatus according to the invention, but are intended to be illustrative rather than definitive thereof. The invention is defined in the claims.

I claim:

1. Apparatus for transferring fluid from a reservoir to a mobile truck-mounted transport tank having therein a float operable to rise and fall in response to changes in the level of fluid in said tank, said apparatus comprising conduit means in communication with said tank; means for separably connecting said conduit to said reservoir; a pump in connection with said conduit means; drive means for driving said pump; an energy source; coupling means operable only when energized by said energy source to couple said driving means to said pump; and adjustable switching means in circuit with said energy source and said coupling means, said switching means in one position thereof being responsive to the level of said float to enable energization of said coupling means by said energy source only when said float is at a level below a predetermined higher level, and said switching means in a second position thereof enabling energization of said coupling means by said energy source regardless of the level of said float.

2. Apparatus according to claim 1 wherein said drive means comprises a fuel pump.

3. Apparatus according to claim 1 wherein said switching means includes a first member normally closed when said float is at a level below said predetermined level and which is opened in response to movement of said float to said predetermined level.

4. Apparatus according to claim 3 wherein said switching means includes a normally open second member bypassing said first member and movable to a closed position following opening of said first member.

5. A method of transferring liquid from a reservoir to a mobile truck-mounted transport tank releasably coupled to said reservoir by a conduit and flow control valve means interposed between said conduit and said reservoir, said method comprising opening said valve means to enable liquid to pass from said reservoir into said conduit; pumping liquid through said conduit into said transport tank; receiving a predetermined level of liquid in said transport tank; disabling operation of said pump in response to said liquid's reaching said predetermined level; closing said valve means; and, while said valve means is closed, pumping liquid from said conduit into said transport tank.

6. The method according to claim 5 including again disabling operation of said pump following the pumping of liquid from said conduit into said tank.

7. The method according to claim 6 including uncoupling said conduit from said reservoir following the pumping of liquid from said conduit into said tank.

8. In a liquid transfer system, particularly for transferring crude oil from a storage tank to a mobile truck-mounted transport tank, and including:
   (a) a storage reservoir,
   (b) a conduit leading from the reservoir,
   (c) a flow control valve interposed between the conduit and reservoir and operable to shut off or permit flow through the conduit,
   (d) a pump in connection with the conduit,
   (e) an energy source,
   (f) drive means for driving said pump,
   (g) coupling means to couple the drive means with the pump,
   (h) adjustable switching circuitry connected with said energy source and said coupling means for operating the coupling means to couple and decouple the drive means and pump,
   (i) a mobile truck with a transport tank,
   (j) a tank supply conduit communicating with the pump and leading to said tank,
   (k) and a sensor, for determining when the liquid level in said tank is at a predetermined level, connected with said circuitry,
   the improvement wherein:
   (l) switch elements, connected in said circuitry, in certain positions cause the coupling means to couple the drive means and pump only so long as the sensor indicates the level in the tank is below said predetermined level, and
   in other positions cause the coupling means to couple the drive means and pump even when the level in the transport tank is at or above said predetermined level.

9. The system of claim 8 wherein the drive means, pump and coupling means are carried by the truck and the sensor is a float operable to rise and fall with changes in the level of fluid in the transport tank.

10. In a liquid transfer system for transferring liquid from a storage tank to a mobile truck-mounted transport tank from a storage reservoir having a conduit leading from the reservoir, and a flow control valve interposed between the conduit and reservoir and operable to shut off or permit flow through the conduit, the apparatus including:
   (a) a mobile truck with a transport tank,
   (b) a pump in connection with the conduit,
   (c) an energy source,
   (d) drive means for driving said pump,
   (e) adjustable switching circuitry connected with said energy source for operating the drive means and pump,
   (f) a tank supply conduit communicating with the pump and leading to said tank, and
   (g) a sensor, for determining when the liquid level in said tank is at a predetermined level, connected with said circuitry,
   the improvement wherein:
   (h) switch elements, connected in said circuitry, in certain positions cause the drive means and pump to operate only so long as the sensor indicates the level in the tank is below said predetermined level and then disable the drive means and pump, and
   (i) means is provided to additionally selectively permit the drive means and pump to operate even when the level in the transport tank is at or above said predetermined level.

11. The system of claim 10 wherein the drive means, energy source, and pump are carried by the truck and the sensor includes a normally closed associated switch connected with the circuitry and a float device carried by the transport tank near the upper end thereof, which is operative to rise with a rise in the level thereof to open the associated switch when a predetermined level is reached in the tank.

12. The system of claim 11 wherein the drive means comprises a power takeoff on the truck.

* * * * *